United States Patent
Mathews et al.

(10) Patent No.: US 7,047,180 B1
(45) Date of Patent: May 16, 2006

(54) METHOD AND APPARATUS FOR PROVIDING ACCESS TO DRAWING INFORMATION

(75) Inventors: Brian Philip Mathews, San Francisco, CA (US); Ratnakar G. Dev, San Rafael, CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/539,500

(22) Filed: Mar. 30, 2000

Related U.S. Application Data (60) Provisional application No. 60/132,057, filed on Apr. 30, 1999.

(51) Int. Cl.
| | |
|---|---|
| *G06F 9/455* | (2006.01) |
| *G06F 15/00* | (2006.01) |
| *G06F 15/16* | (2006.01) |
| *G06F 7/00* | (2006.01) |
| *G06F 17/00* | (2006.01) |

(52) U.S. Cl. .................. 703/27; 358/1.15; 709/217; 707/101

(58) Field of Classification Search .............. 703/27; 358/1.15; 709/217; 707/101, 9, 10; 717/138, 717/143
See application file for complete search history.

(56) References Cited

U.S. PATENT DOCUMENTS

| | | | |
|---|---|---|---|
| 5,133,052 A | | 7/1992 | Bier et al. |
| 5,608,874 A | * | 3/1997 | Ogawa et al. ............ 709/246 |
| 5,646,862 A | * | 7/1997 | Jolliffe et al. ............ 703/1 |
| 5,675,782 A | | 10/1997 | Montague et al. |
| 5,911,776 A | * | 6/1999 | Guck ..................... 709/217 |
| 6,057,929 A | * | 5/2000 | Walker ................... 358/1.15 |
| 6,604,106 B1 | * | 8/2003 | Bodin et al. ............. 707/101 |

OTHER PUBLICATIONS

"AutoCAD and its applications" by Terence M. Shumaker et. al., The Goodheart-Willcox Company, Inc., 1998, pp. 267, 268, and 277.*

"AutoCAD and its applications" by Terence M. Shumaker et. al., The Goodheart-Willcox Company, Inc., 1998, p. 347.*

"How Networks Work" by Derfler et al., Fourth Edition, 1998, Que Corporation, ISBN: 0-7897-1595-3, p. 119.*

(Continued)

*Primary Examiner*—Paul L. Rodriguez
*Assistant Examiner*—Dwin M. Craig
(74) *Attorney, Agent, or Firm*—Gates & Cooper LLP (57) ABSTRACT

A method, apparatus, and article of manufacture for automating the finding and serving of CAD design data is disclosed. One or more embodiments of the invention increase the level of access and automation possible with design data. One or more embodiments of the invention provide a server comprised of various components including an information extraction component, a search component, and a conversion component. The various components provide users with enhanced access to drawing and design data. One or more embodiments of the invention also provide programmable, scriptable components that can query, filter, manipulate, merge, and translate design drawing data using the Web browser interface. Further, Web site administrators can use the present invention to dynamically index and publish design drawing data.

15 Claims, 7 Drawing Sheets

OTHER PUBLICATIONS

"Understanding Thin-Client/Server Computing" by Joel P. Kanter, Microsoft Press, 1998, pp. i through 261.*

Internet Information Services 5.0 Technical Overview, © 1999, 36 pgs.

For Starters: #12. Rise of the Serving Class: Internet Information Server 4.0, © 1999, 8 pgs.

Internet Information Server 4.0 Data Sheet, © 1999, 3 pgs.

Comparing Internet Information Server with Competing Products, © 1999, 4 pgs.

Active Server Page, © 1981-1999, 1 pg.

Autodesk, "AutoCAD Release 14 User's Guide", Dec. 5, 1997.

* cited by examiner

METHOD AND APPARATUS FOR PROVIDING ACCESS TO DRAWING INFORMATION

CROSS-REFERENCE TO RELATED APPLICATIONS

This application claims the benefit under 35 U.S.C. §119 (e) of co-pending and commonly assigned U.S. Provisional application Ser. No. 60/132,057, entitled "AUTOMATED SEARCHING AND DISTRIBUTION OF DESIGN DRAWING DATA TO INTERNET BROWSERS," filed on Apr. 30, 1999, by Brian Phillip Mathews et. al., which application is fully incorporated by reference herein.

This application is related to the following co-pending and commonly-assigned patent applications, all of which applications are fully incorporated by reference herein:

U.S. patent application Ser. No. 09/501,474, entitled "INTELLIGENT DRAWING REDLINING AND COMMENTING FEATURE", by Vincent Abeyta, et. al., filed on Feb. 9, 2000; and U.S. Provisional Patent Application Ser. No. 60/126,170, entitled "CAD DRAWING COLLABORATION VIA WEB BASED SYSTEMS", by Mark E. Sweat et. al., filed on Mar. 25, 1999.

BACKGROUND OF THE INVENTION

1. Field of the Invention

The present invention relates generally to transmission of data between computers, and in particular, to a method, apparatus, and article of manufacture for providing access to drawing information and for automated searching, translation, filtering, change notification, version management, and distribution of design drawing data.

2. Description of the Related Art

The use of Computer Aided Design (CAD) application programs is well known in the art. CAD application programs use specific formats to store drawing data. These formats include ".DWG" formatted drawings, ".DWF" formatted drawings, and other formats.

The drawing formats are typically unique to a given CAD application program. The drawing formats were designed to store drawing data on a single computer or a single host computer, and are not easily transported via computer data links, typically because of the size of drawing files and the uniqueness of the computer objects.

However, with the advent of collaborative efforts using computer data links, custom libraries of CAD objects, and other computer-based tools that allow multiple users to access drawings from geographically diverse sites, the drawing formats have become cumbersome to the progress of remote computing. The now widespread use of the Internet, Intranets, and Local Area Networks (LANs) requires that the drawing formats be more compatible with network and web-enabled systems.

Consequently, there is a need in the art for improved techniques to access, translate, and manipulate CAD designed drawing data on a network. Further, there is a need in the art for improved techniques for formatting the data such that the various parties that desire access to the CAD data can obtain the information desired. These problems may be better understood by describing drawing formats and prior art access techniques.

Drawing Formats

As described above, CAD application programs use specific formats to store drawing data. These formats include ".DWG" formatted drawings, ".DWF" formatted drawings, ".DXF" formatted drawings, and other formats.

The "DWG" format is a standard file format for saving vector graphics from within CAD drawing programs such as AutoCAD® available from AutoDesk, Inc.

The "DWF" (drawing web format) format is an industry internet standard recognized by IETF, was developed by the assignee of the present invention, AutoDesk, Inc. and is an open file format for the transfer of drawings over networks, including the internet. DWF is a highly compressed file format that is created from a DWG file. DWF files are easy to publish and view on the web. Further, DWF is a vector graphics format for the transfer of drawings over intranets and the internet. DWF is a graphics format for vector data, unlike GIF or JPEG which are graphics formats for raster data. DWF files can be generated by any application that supports DWF exporting. Further, any DWF file can be viewed by any DWF viewer. DWF uses compression to speed up data transfer times. Further, DWF removes the "non-visual" components of a drawing, like attributes, properties, and complex object behavior. In other words, DWF is an "electronic plot" that is "view-only". DWF supports hyperlinking, so that vectors or areas in a drawing can be made "active".

Users of DWF have three benefits: speed, security and precision. DWF provides speed because of the high compression utilized so that files are smaller and faster to transmit and open than full-blown CAD files. Most DWFs are from 50–90 percent smaller than DWG files. DWF provides security because DWF files cannot be modified, so they maintain the integrity of the original CAD DWG file which it is based on. In effect, the DWF is a "digital plot" of the original DWG drawing. DWF provides precision because DWF files are vector-based. When zooming in a DWF, precision is maintained; with other bitmap formats (e.g., GIF or JPEG), zooming results in "fat pixels".

"DXF" formatted drawings are drawings formatted in the document exchange format. Many CAD systems import and export the DXF format for graphics interchange.

Access Techniques

Figure 1:
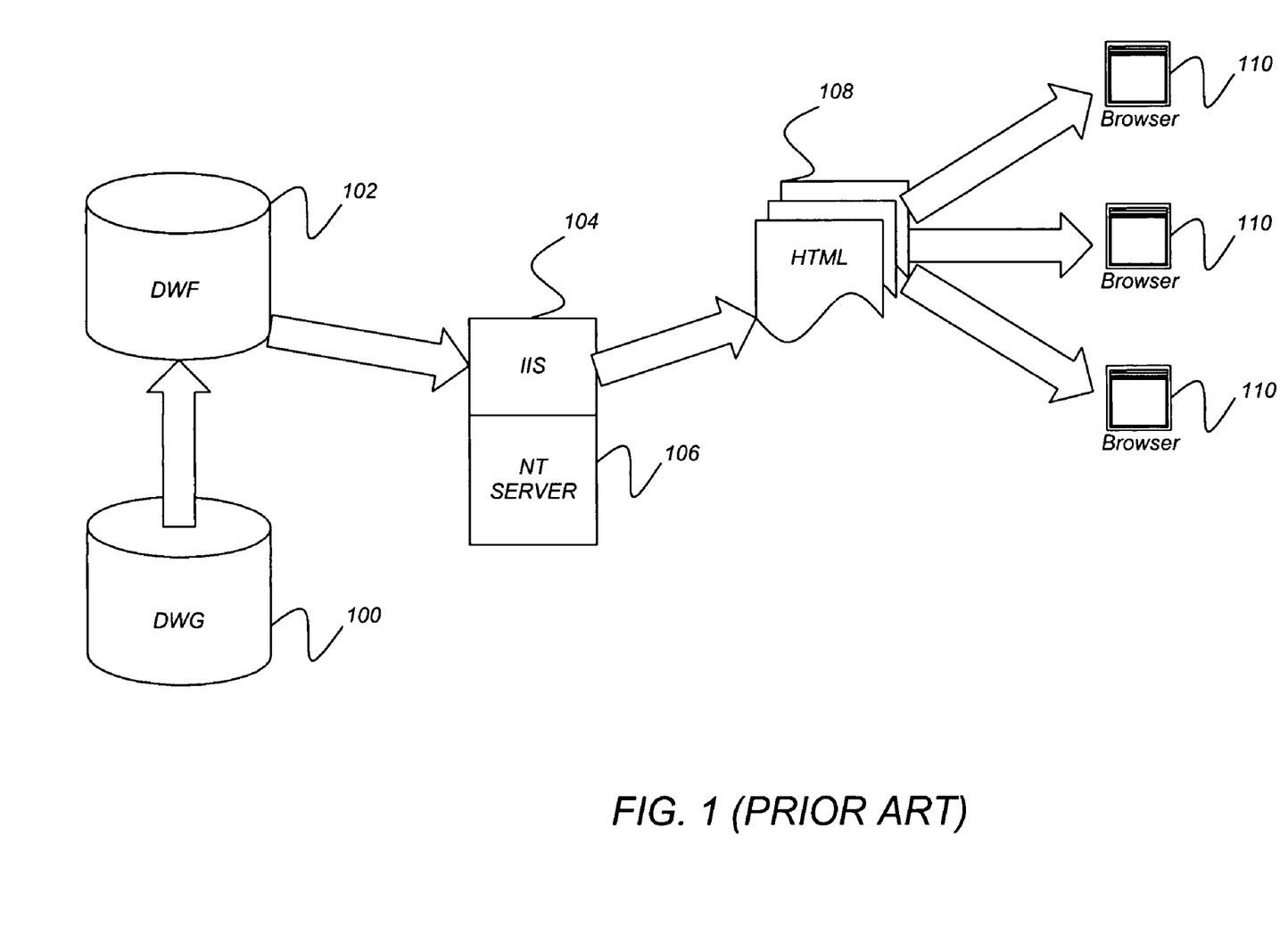
FIG. 1 illustrates the prior art environment for providing access to drawing information.

FIG. 1 illustrates techniques for publishing drawing information (i.e., providing access to drawing information). A drawing program such as AutoCAD® is utilized to create one or more DWG drawings 100. The drawings may then be converted to DWF format 102 (or other format) by the drawing program.

Once the format has been converted by a drawing program user, the DWF file may be published using a web server. For example, in FIG. 1, an information internet server (IIS) 104 (available from Microsoft) is utilized in combination with NT server 106 (available from Microsoft) to publish the DWF information. IIS is an internet file and application server that is included with the Microsoft Windows NT Server operating system. IIS can be used alone as a web server, or in conjunction with compatible technologies to set up internet commerce, to access and manipulate data from a variety of data sources, and to build web applications that take advantage of server script and component code to deliver client-server functionality. Other internet servers that the prior art utilizes include the Netscape Enterprise Server and the Apache server.

Server 104 creates HTML documents 108 that may be viewed by browsers 110. Many browsers are available in the prior art including Internet Explorer and Netscape Navigator. Thus, the prior art provides the ability to view a DWF file 102 and information about the DWF file 102 using a drawing program to convert DWG files to DWF files and a server 104 to create HTML pages 108 for viewing over the internet using a browser 110.

SUMMARY OF THE INVENTION

To address the requirements described above, one or more embodiments of the invention provide a method, apparatus, and article of manufacture for automating the finding and serving of CAD design data. One or more embodiments of the invention increase the level of access and automation possible with design data. One or more embodiments of the invention provide a server comprised of various components including an information extraction component, a search component, and a conversion component. The various components provide users with enhanced access to drawing and design data. One or more embodiments of the invention also provide programmable, scriptable components that can query, filter, manipulate, merge, and translate design drawing data using a graphical user interface. Further, network and web site administrators can use the present invention to dynamically index and publish design drawing data.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and in which is shown, by way of illustration, several embodiments of the present invention. It is understood that other embodiments may be utilized and structural changes may be made without departing from the scope of the present invention.

Overview

The present invention discloses a method, apparatus, and article of manufacture for providing access over a network to drawing information including the automating, finding, translation, filtering, merging, manipulation, and serving of CAD design data. The level of access and automation possible with design data is increased. A server comprises several components including an information extraction component, a search component, and a conversion component. The invention also provides programmable, scriptable components that can query, filter, merge, and translate design drawing data using a graphical user interface such as a Web browser interface. Further, network and Web site administrators can use the present invention to dynamically index and publish design drawing data.

The present invention allows for the custom creation of Hyper Text Mark-up Language (HTML) pages from CAD files automatically. Further, the present invention automatically translates DWG and DXF files into a number of other formats, e.g., DXF, DWF, JPEG (Joint Photographic Experts Group), BMP (BitMaP), DWG R9-14 (a DWG format for one or more AutoCAD® versions/releases), and other formats. The present invention also allows for searching of DWG, DXF, and DWF files to locate data based on drawing properties, text, layers, blocks, attributes, or other search parameters supplied by a user.

The present invention is compatible with popular web browsers, e.g., Netscape Navigator and Internet Explorer. Further, the present invention interfaces with Microsoft Active Server Pages (ASP) and Common Gateway Interface (CGI) scripts. These compatibility and interface capabilities of the present invention allow the present invention to create powerful, data-driven networks and web sites that index, query, translate, filter, manipulate, and reference DWG data for a variety of uses, including product catalogs, detail managers, standards libraries, and other extranet/intranet/Internet applications. Further, the present invention allows designers to create a self-service network such as an FTP (file transfer protocol) or web site that allow others to download drawings in whatever format is desired, which eliminates the need for designers to perform conversion and publishing tasks.

Hardware Environment

Figure 2:
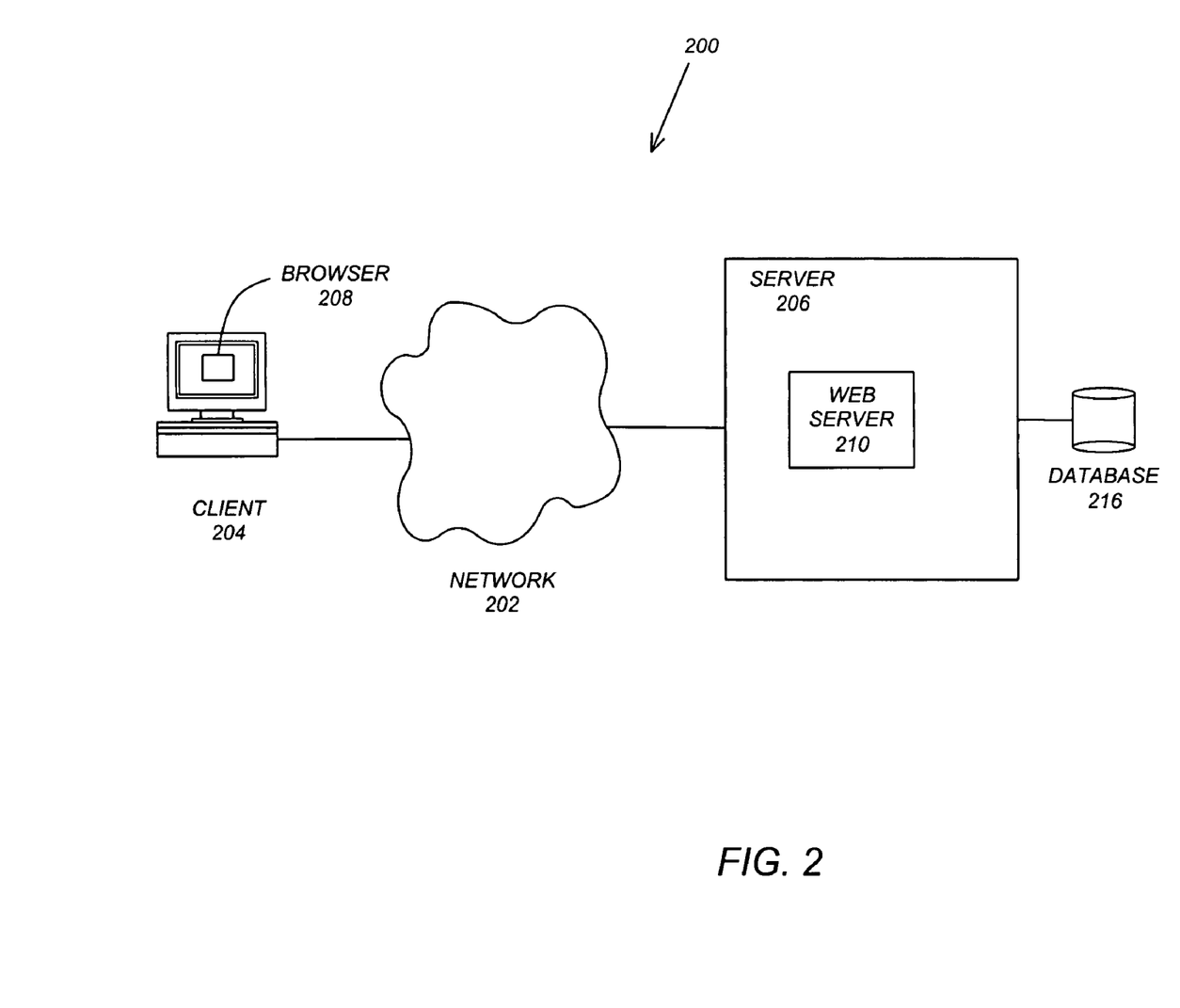
FIG. 2 is an exemplary hardware environment in accordance with one or more embodiments of the invention.

FIG. 2 schematically illustrates a hardware and software environment in accordance with one or more embodiments of the invention, and more particularly, illustrates a typical distributed computer system 200 using a network 202 to connect client computers 204 to server computers 206. A typical combination of resources may include a network 202 comprising the Internet, LANs, WANs, SNA networks, or the like, clients 204 that are personal computers or workstations, and servers 206 that are personal computers, workstations, minicomputers, or mainframes.

The Internet 202 connects client computers 204 executing Web browsers 208 to server computers 206 executing Web servers 210. The Web browser 208 is typically a program such as Netscape's Navigator or Microsoft's Internet Explorer. The Web server 210 is typically a program such as IBM's HyperText Transport Protocol (HTTP) Server or Microsoft's Internet Information Server. In one or more embodiments, the servers 206 also interface and/or manage a database 216.

Generally, components 202–216 all comprise logic and/or data that is embodied in or retrievable from device, medium, signal, or carrier, e.g., a data storage device, a data communications device, a remote computer or device coupled to the computer via across a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby. Specifically, those skilled in the art will recognize that the present invention may be applied to any database, associated database management system, or peripheral device.

Computer-Implemented Graphics Program

Embodiments of the invention may be implemented in a variety of applications and environments. For example, in one implementation, a network for architects may be created with standard and best practice drawings that are searchable, transformable, etc. In a second implementation, a building system web page may be created that offers a searchable catalog of components. In a third implementation, a facilities management application may allow updates and indexes to a floor plan that is published on the internet. In a fourth implementation, a project web site may allow easy access to drawing data via a quick preview (e.g., a thumbnail view) without the author manually publishing or converting the drawing or manually searching for information using a drawing viewer. The above four implementations are illustrative of the types of applications that may utilize embodiments of the invention. However, embodiments of the invention may be utilized in any type of application, system, network, etc.

Server Implementation

Figure 3:
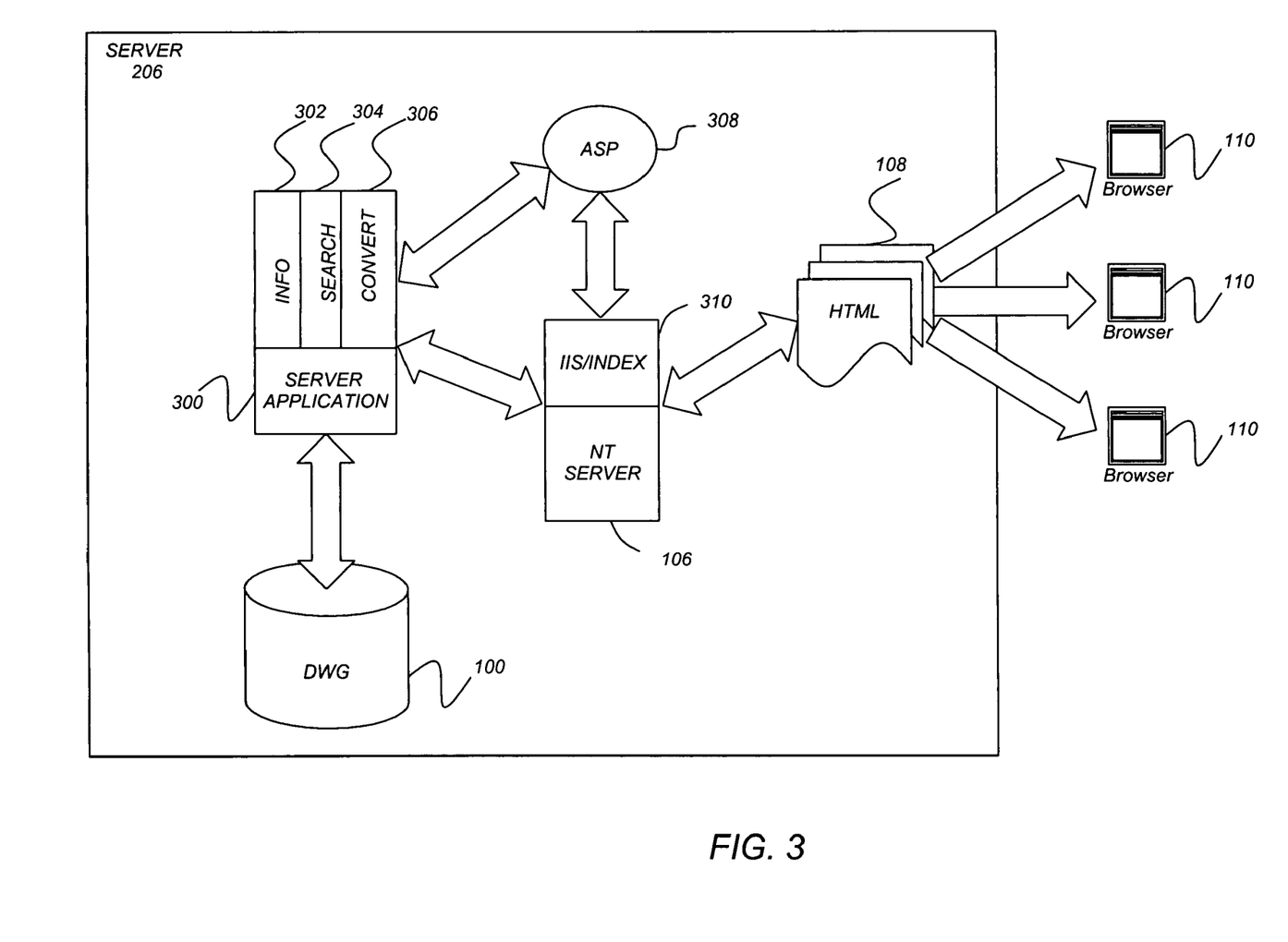
FIG. 3 illustrates the details of a server, server components, and the interaction between server components in accordance with one or more embodiments of the invention.

Components of the invention may be used in any type of network or system such as an intranet or LAN. One or more embodiments implement server 206 and server components to provide the user with various capabilities and options. FIG. 3 illustrates the details of a server 206, server components, and the interaction between server components in accordance with one or more embodiments of the invention. As in the prior art, drawings are created by a drawing program such as AutoCAD® and stored in a database 100 in DWG format. However, in accordance with one or more embodiments of the invention, the drawing program does not need to convert the DWG file into another format (e.g., DWF format).

Server application 300 contains various components that enable various capabilities. The information extraction component 302 provides information relating to the file such as the size of the file, relevant dates, the author, etc. Such information may be displayed to the user using HTML 108 on a web browser 110. However, this information may also be utilized internally and not presented to a user.

Search component 304 provides a query engine that allows complex property and tag-based queries of the drawing files stored in database 100. Search component 304 may also provide a live LAN (local area network) crawler that traverses the LAN to obtain information. In one or more embodiments, the crawler is live and not batched so that the index stays current.

The conversion component 306 enables the transformation from one drawing file format to another drawing file format (e.g., DWG to DWF). Additionally, the conversion component 306 is cached for speed and scalability.

Server application 300 and its components 302-306 may interface with a variety of applications to provide the functionality of components 302-306 to a variety of types of systems in a variety of applications. In one or more embodiments, server application 300 and its components 302-306 interact with an ASP 308. ASP (Active Server Page) 308 is a web page that contains programming code written in VB (visual basic) script, Javascript, or other scripting language. When IIS server 310 encounters an ASP 308 that is requested by browser 110, IIS server 310 executes the embedded program to create HTML pages 108. Essentially, ASPs 308 are utilized to dynamically generate HTML pages 108 for viewing by browsers 110. ASPs 308 are supported by IIS 310 and NT server 106 that enable the HTML 108 generation. Thus, when one of the server components 302-306 is activated, the programming code of an ASP 308 may be executed to produce HTML pages 108. In one or more embodiments, ASP 308 provides for the conversion and storing of a drawing file into a selected format. For example, when the user selects a desired file format hyperlink (see description below), the ASP 308 interacts with the conversion server component 306 to convert/transform the drawing and the ASP 308 provides for the user interface (e.g., the prompts to open, save, and select the save location).

Figure 4:
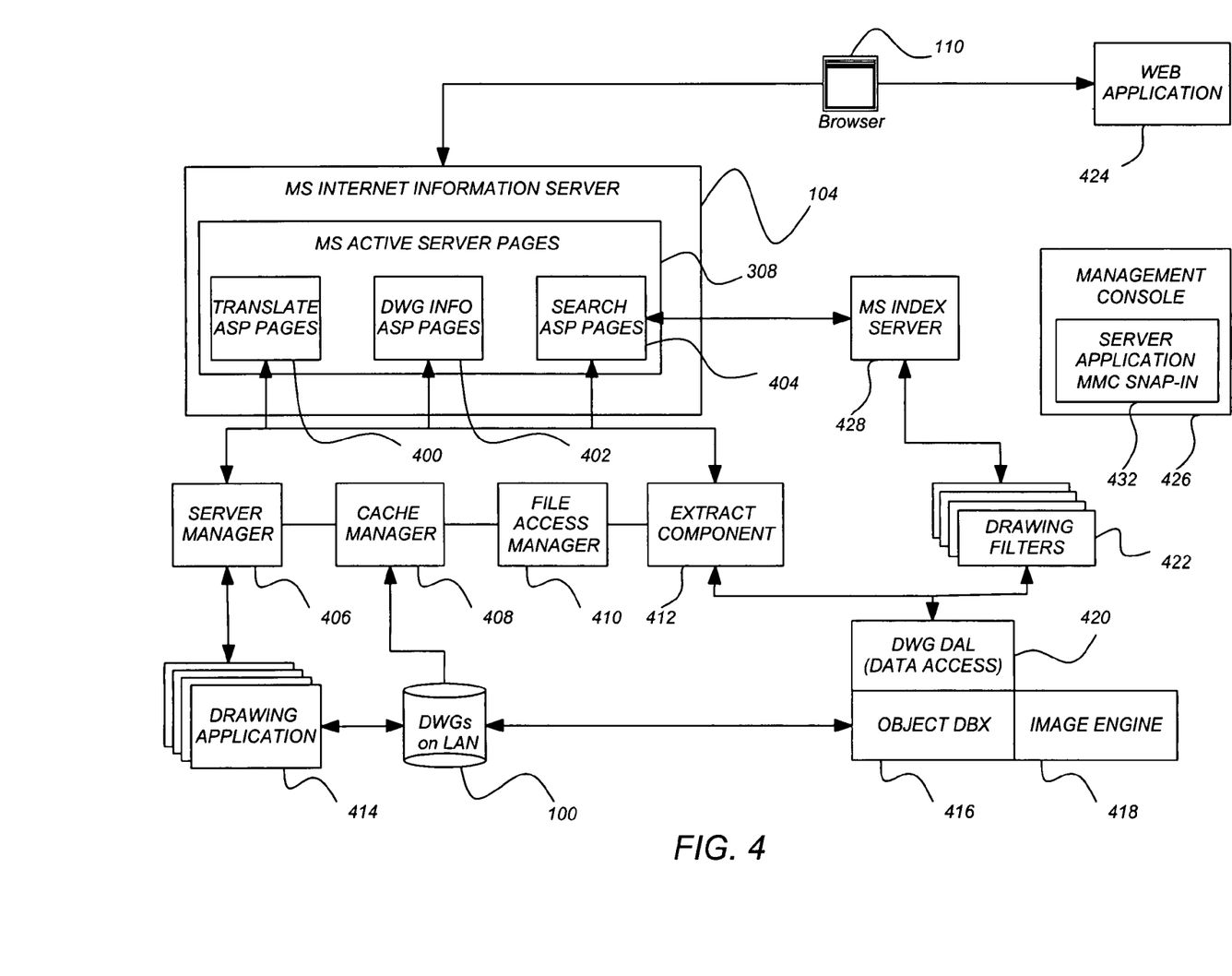
FIG. 4 illustrates further details of a server design in accordance with one or more embodiments of the invention.

FIG. 4 illustrates further details of a server design in accordance with one or more embodiments of the invention. On the user side, browser 110 may be utilized in combination with a web application 424 or other application installed on a user computer to interact, manipulate, retrieve, and display web pages or drawings. For example, the browser 110 or other application may interact with VoloView®, an application available from AutoDesk, Inc. Alternatively, any application or application programming interface (API) can be utilized on the user/client or server side to utilize the components 302-306 of the invention.

Components of the invention include translate ASP pages component 400 (e.g., convert server component 306), DWG info ASP pages component 402 (e.g., info server component 302), search ASP pages component 404 (e.g., search server component 304), server manager 406, cache manager 408, file access manager 410, extraction component 412, drawing filters 422, server application MMC (Microsoft Management Console) snap-in 432, and DWG DAL (data access) 420. The remaining components of FIG. 4 may be utilized by embodiments of the invention.

Drawing applications 414 (e.g., AutoCAD®) create the various DWG files and store them as DWGs on a LAN 100. The files may be manipulated and displayed by ObjectDBX 416 (an object oriented database available from AutoDesk, Inc.) and image engine 418. DWG DAL (data access) 420 interacts with ObjectDBX 416 and image engine 418 to provide access to the information in the DWG files. ObjectDBX 416 is the software framework component that AutoCAD® uses to access, read, and write to intelligent object databases. Developers can take advantage of a system that utilizes ObjectDBX 416 by designing their application as two distributed components: a core logic component (.arx) and a database extension component (.dbx).

Server manager 406, such as the AutoCAD® Server Manager, interacts with the drawing application 414. Cache manager 408 provides for uploading and storing the DWG files 100 in local cache. File access manager 410 manages control of the files.

The IIS 104 and ASP 308 provide for the interaction between browser 110 and the drawings 100. As described above, ASPs 308 are responsible for invoking the various components in accordance with a user's request. For example, ASP 308 may translate the drawing into a different format 400, retrieve/extract information 402, or search 404 the DWG files 100 for certain information or attributes. Each of these actions from ASPs 308 may utilize other system components (e.g., server manager 406, cache manager 408, file access manager 410, or extraction component 412).

Search component 404 may utilize an index server 428 that interacts with drawing filters 422 to filter and retrieve information. For example, each drawing filter 422 may filter information from a different type of drawing format such that one drawing filter 422 may be for DWG files, another filter 422 for DWF files, and another filter for DXF files, etc. Additionally, management console 426 may contain a server application MMC (Microsoft Management Console) snap-in 432. A MMC snap-in 432 is a component responsible for performing management tasks. MMC 426 serves as a host for snap-in-defined user interfaces, but does not limit what the snap-ins 432 can do or how they communicate with the administered services.

Other configurations and/or user interfaces are possible without departing from the scope of the present invention. For example, any type of computer, such as a mainframe, minicomputer, workstation or personal computer, could be used with the present invention. In addition, any software program, network, application, or operating system having a user interface could benefit from the present invention.

Interface

Figure 5:
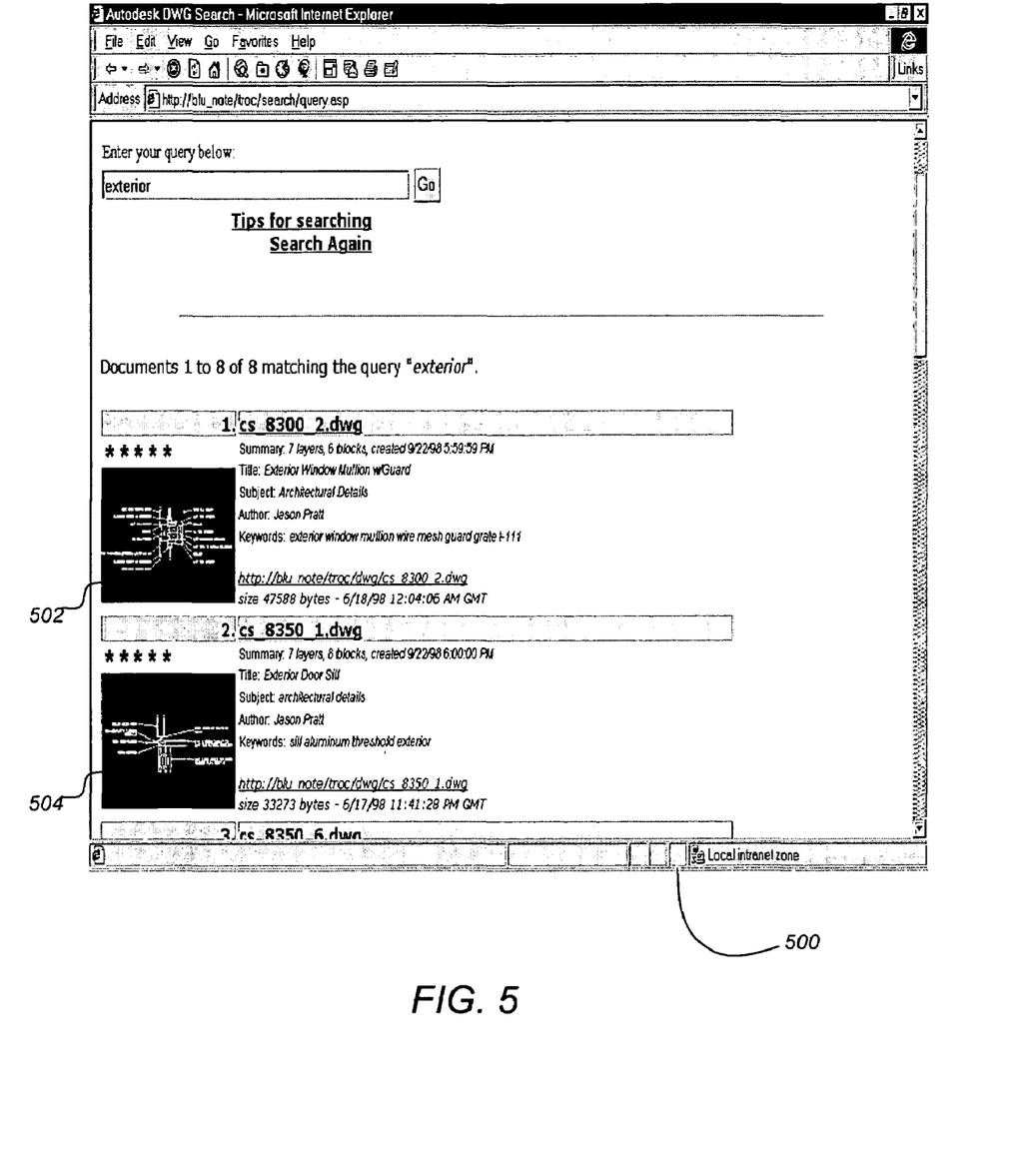
FIGS. 5–7 illustrate the user interface in accordance with one or more embodiments of the invention.
Figure 6:
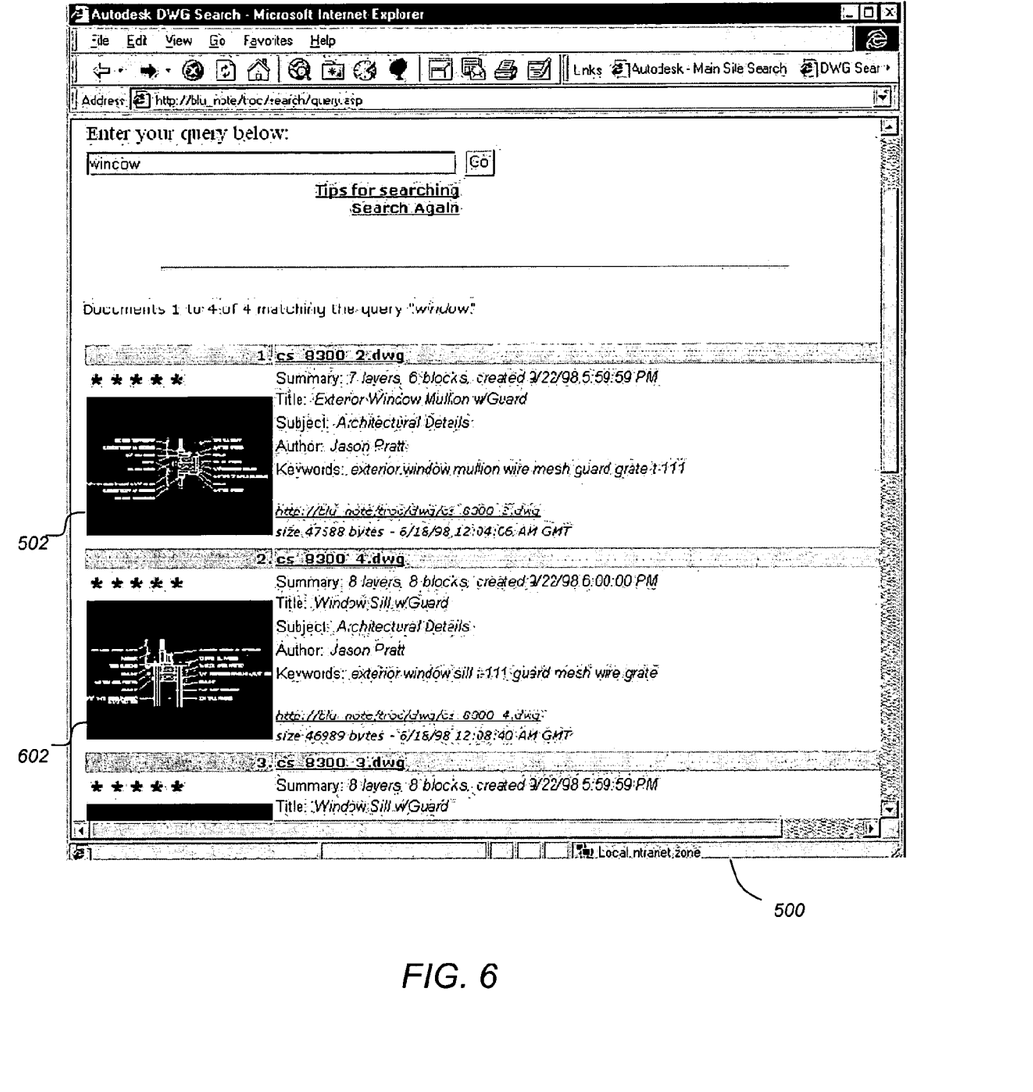
Figure 7:
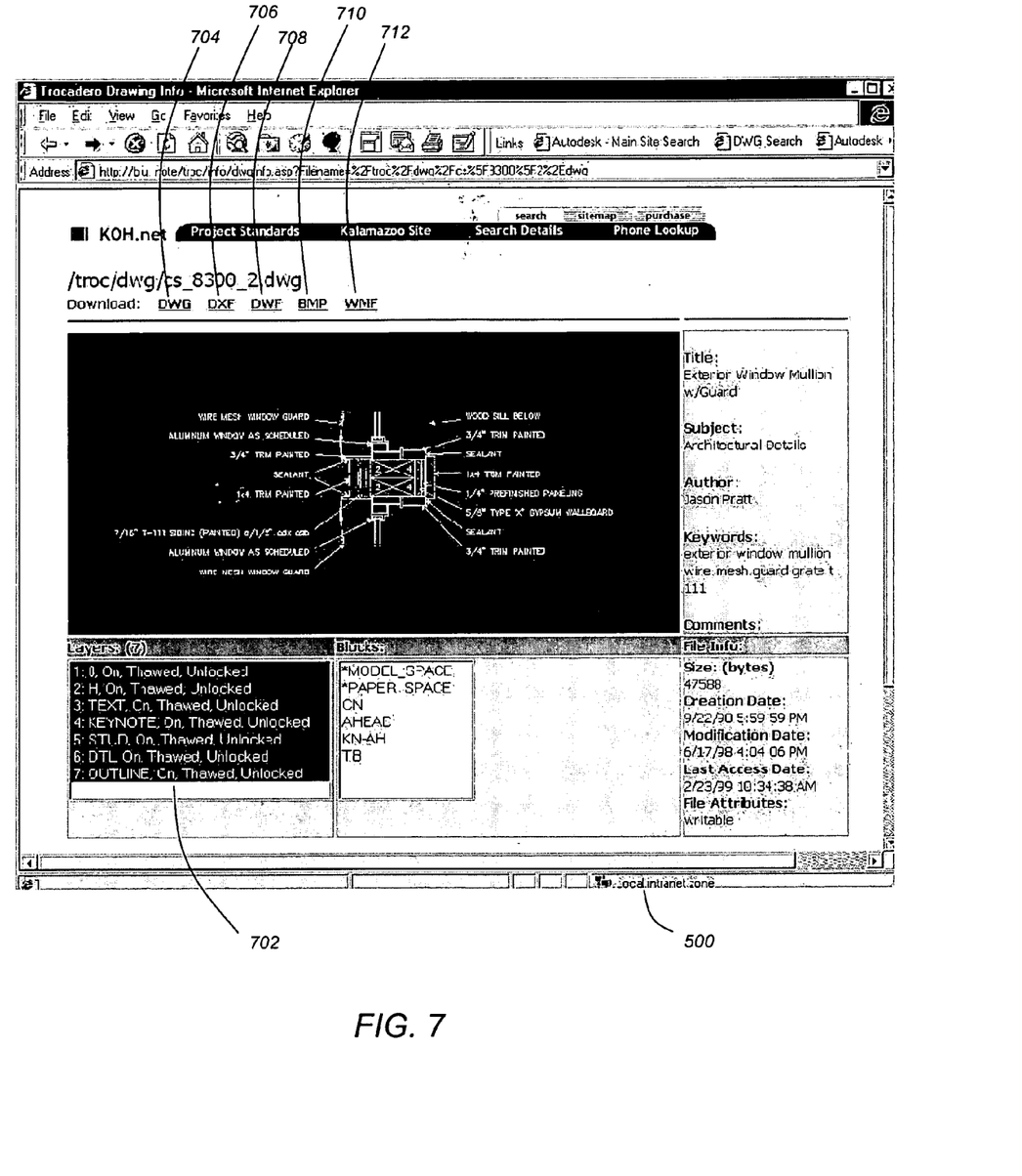

The components described in FIGS. 3 and 4 may be utilized as an Application Programming Interface (API) for servers 206 to present information to a user, programmer, or developer. In one implementation, the components are utilized to produce web pages that are displayed on a browser 110. Such an interface may allow the real time search, retrieval, file format conversion, and display of drawing information. FIGS. 5–7 illustrate the user interface used in accordance with one or more such embodiments.

FIG. 5 illustrates a typical web browser interface 500 as displayed on a client 204. Within interface 500, a query box is indicated that allows a user to enter a query, e.g., a word, symbol, or other item that the user wishes to locate within CAD files accessible by the user. As shown in FIG. 5, the query entered is "exterior." The user then clicks on the "search" or "go" button to enter the search terms into the present invention. Additional hyperlinks are provided to allow the user to obtain assistance in searching the DWG files ("Tips for searching") or to create a new search query ("Search Again").

Once the present invention completes the search, the CAD files that contain the search terms are displayed in a condensed format for the user to view. As shown in FIG. 5, eight documents matched the search term "exterior." The first document is entitled cs_8300_2.dwg, and the second document is entitled cs_8350_1.dwg.

FIG. 6 illustrates the typical web browser interface 500 as displayed on a browser 208 for a new search term. Within the query box, the user has replaced "exterior" with "window."

The CAD files that contain the search term "window" are displayed in a condensed format for the user to view. As shown in FIG. 6, four documents matched the search term "window." The first document is entitled cs_8300_2.dwg, and the second document is entitled cs_8300_4.dwg. As demonstrated in both FIGS. 5 and 6, thumbnail views 502, 504, and 602 of the drawings are displayed. In accordance with one or more embodiments of the invention, the user may select the image in the thumbnail views 502, 504, and 602 and move the image within the display area 502, 504, and 602 or perform other actions on the image while still in thumbnail view.

The user can enter more than one term in the query box to perform more advanced searches if desired.

After performing the searches as described with respect to FIGS. 5 and 6, the user may decide that a specific drawing meets the criteria for more detailed viewing. To view the specific drawing in more detail, the user merely selects or clicks on the desired drawing or hyperlink (e.g., the title of the document that appears underlined and in a different color). FIG. 7 illustrates a typical web browser interface 500 as displayed on monitor 202 which displays an expanded view of drawing 1, cs_8300_2.dwg, which the user has selected.

The expanded view of the drawing retrieved by the search of the present invention allows the user to view in more detail the drawing(s) that the search queries yielded. The user can then decide whether the expanded drawing is the drawing desired, or if other drawings are more suited to the user's needs. Further, the user may decide to have a new drawing automatically created by filtering out certain layers of the existing drawing, or have the existing drawing translated into another file format.

Once the detailed drawing is displayed as illustrated in FIG. 7, the user may perform various operations. For example, the display itself may be linked to an application program such as WHIP!® available from AutoDesk, Inc. Such applications may provide the user with the ability to zoom, filter the current view based on a layer, display another view of the same model, copy the image, print the image, save the image, etc. Such options may be accessible by clicking the right mouse button while the cursor is over the image.

In FIG. 7, the displayed layers are identified textually in box 702. By selecting any of the layers in box 702, the image will be filtered and the selected layer will be displayed. Additional display regions may contain further information relating to the drawing (e.g., the title, subject, author, keywords, comments, size, creation date, modification date, last access date, and file attributes).

Hyperlinks 704–712 provide the ability to translate the format of the drawing to another format. The current format is indicated by boldfacing the type of the format. For example, in FIG. 7, the DWG format hyperlink 704 is boldfaced to indicate that the current format being viewed is in DWG format. To transform the image, the user merely needs to select a format that is hyperlinked. For example, if the user desires to transform the drawing into DWF format, the DWF hyperlink 708 is selected. Alternatively, the user may select the DXF format hyperlink 706, the BMP format hyperlink 710, or the WMF (Windows MetaFile) format hyperlink 712. After selecting the appropriate hyperlink, the user may be prompted to either open the file or save the file. If the user elects to save the file, one or more embodiments of the invention prompts the user to select a filename and location to store the file in the selected format.

CONCLUSION

In summary, the present invention discloses a method, apparatus, and article of manufacture for providing access to drawings on a network. Drawings may be transformed from one format to another format automatically on the fly. One or more embodiments provide components that integrate with back office servers, users (with or without web browsers), viewing applications (e.g., WHIP!®, VoloView™, or AutoCAD®), and drawing data (e.g., DWG data).

The invention provides for automating the finding and serving of CAD design data and increases the level of access, manipulation, and automation possible with design data. The present invention also provides programmable, scriptable components that can query, filter, search, merge, and translate design drawing data. Further, administrators can use the present invention to dynamically index and publish design drawing data.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description.

We claim:

1. A computer implemented system for providing access to a drawing comprising:
 a drawing file;
 an information extraction server component configured to provide information relating to the drawing file from a group of information comprising file size, date, and author;
 a search server component configured to provide a query engine that allows queries of the drawing file; and
 a conversion server component configured to transform the drawing file from one drawing file format to another drawing file format without accessing the application that created the drawing file; and
 a server comprising the information extraction server component, the search server component, and the conversion server component, wherein the server is configured to provide the information, query results, and the transformed drawing file across a network to a user using a graphical user interface of a web browser.

2. The system of claim 1 further comprising an active server page (ASP) that interacts with one or more of the server components to obtain requested information in the graphical user interface on the web browser.

3. The system of claim 1 wherein the conversion component is cached.

4. The system of claim 1 wherein the search server component utilizes an index server that interacts with one or more drawing filters to filter and retrieve information.

5. The system of claim 1 wherein the drawing file is stored in DWG file format.

6. A method for providing access to a drawing comprising:
 obtaining information relating to a drawing file from a group of information comprising file size, date, and author;
 providing a query engine that allows queries of the drawing file; and
 transforming the drawing file from one drawing file format to another drawing file format without accessing the application that created the drawing file;
 providing the information, query results, and the transformed drawing file across a network to a user using a graphical user interface of a web browser.

7. The method of claim 6 further comprising obtaining requested information in the graphical user interface on the web browser using an active server page (ASP).

8. The method of claim 6 further comprising caching the conversion component.

9. The method of claim 6 further comprising filtering and retrieving information utilizing an index server that interacts with one or more drawing filters.

10. The method of claim 6 wherein the drawing file is stored in DWG file format.

11. An article of manufacture embodying logic for performing a method for accessing a drawing over a network, the method comprising:
 obtaining information relating to a drawing file from a group of information comprising file size, date, and author;
 providing a query engine that allows queries of the drawing file; and
 transforming the drawing file from one drawing file format to another drawing file format without accessing the application that created the drawing file;
 providing the information, query results, and the transformed drawing file across a network to a user using a graphical user interface of a web browser.

12. The article of manufacture of claim 11 wherein the method further comprises obtaining requested information in the graphical user interface on the web browser using an active server page (ASP).

13. The article of manufacture of claim 11 where the method further comprises caching the conversion component.

14. The article of manufacture of claim 11 wherein the method further comprises filtering and retrieving information utilizing an index server that interacts with one or more drawing filters.

15. The article of manufacture of claim 11 wherein the drawing file is stored in DWG file format.

* * * * *